United States Patent
Hutchison et al.

(10) Patent No.: US 8,499,184 B2
(45) Date of Patent: *Jul. 30, 2013

(54) METHOD FOR RESUMING A SYSTEM FROM A POWER FAILURE AFTER THE MAIN POWER SUPPLY HAS RECOVERED AND PRIOR TO FULLY RECHARGING THE BACKUP POWER SUPPLY BY ENABLING THE RECEPTION OF INPUT/OUTPUT COMMANDS BY THE CACHE MEMORY AT A RATE PROPORTIONAL TO THE AMOUNT OF CHARGE ON THE BACKUP POWER SUPPLY CURRENTLY AVAILABLE

(75) Inventors: Gordon D. Hutchison, Eastleigh (GB); Paul J. Quelch, Emsworth (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,031

(22) Filed: May 1, 2012

(65) Prior Publication Data

US 2012/0221879 A1    Aug. 30, 2012

Related U.S. Application Data

(63) Continuation of application No. 12/717,684, filed on Mar. 4, 2010.

(30) Foreign Application Priority Data

Mar. 9, 2009  (EP) .................................... 09154610

(51) Int. Cl.
G06F 1/00 (2006.01)
G06F 13/00 (2006.01)

(52) U.S. Cl.
USPC ............................................ 713/340; 711/118

(58) Field of Classification Search
USPC ........................................... 713/340; 711/118
See application file for complete search history.

(56) References Cited

U.S. PATENT DOCUMENTS

| 5,167,024 | A | * | 11/1992 | Smith et al. ................... 713/322 |
| 5,565,759 | A | * | 10/1996 | Dunstan ......................... 320/135 |
| 6,079,026 | A | | 6/2000 | Berglund et al. |
| 7,275,182 | B2 | | 9/2007 | Egan et al. |
| 2004/0054851 | A1 | * | 3/2004 | Acton et al. .................. 711/118 |
| 2005/0117418 | A1 | * | 6/2005 | Jewell et al. ................. 365/202 |
| 2008/0005474 | A1 | * | 1/2008 | Long ............................. 711/118 |
| 2009/0031099 | A1 | * | 1/2009 | Sartore ......................... 711/162 |

* cited by examiner

*Primary Examiner* — Thomas Lee
*Assistant Examiner* — Terrell Johnson
(74) *Attorney, Agent, or Firm* — Griffiths & Seaton PLLC (57) ABSTRACT

Following a loss of power, a storage system switches to a local power supply. The system switches to the local power supply, prevents the receipt of input/output commands and copies the content of cache memory to a local storage device. On detecting resumption of external power, the system charges a local power supply, copies the content of the local storage device to the cache memory and processes the content of the cache memory with respect to at least one storage volume. When the charge stored on the local power supply exceeds the charge required to copy the content of the cache memory to the local storage device by a predetermined amount, the system allows the receipt of input/output commands using a reduced portion of the cache memory. Once the charge stored on the local power supply has reached a predetermined level, the system allows the receipt of input/output commands using all cache memory.

10 Claims, 7 Drawing Sheets

Fig. 5 though otherwise operational. As previously mentioned, the illustrated embodiments provide various mechanisms for executing emergency power off/on cycles and resuming normal work in storage systems via a three-stage power up mechanism as will be further described.

METHOD FOR RESUMING A SYSTEM FROM A POWER FAILURE AFTER THE MAIN POWER SUPPLY HAS RECOVERED AND PRIOR TO FULLY RECHARGING THE BACKUP POWER SUPPLY BY ENABLING THE RECEPTION OF INPUT/OUTPUT COMMANDS BY THE CACHE MEMORY AT A RATE PROPORTIONAL TO THE AMOUNT OF CHARGE ON THE BACKUP POWER SUPPLY CURRENTLY AVAILABLE

CROSS REFERENCE TO RELATED APPLICATIONS

This application is a Continuation of U.S. patent application Ser. No. 12/717,684, filed on Mar. 4, 2010, which claims priority to European Patent Application No. 09154610.1, filed Mar. 9, 2009, and entitled "Three Stage Power Up."

BACKGROUND OF THE INVENTION

1. Field of the Invention

The present invention relates in general to computers, and more particularly to various embodiments for executing emergency power off/on cycles and resuming normal work in storage systems via a three-stage power up mechanism.

2. Description of the Related Art

In computer storage systems it is common to have multiple storage volumes connected to a single storage volume controller, which is responsible for the reading and writing of data with respect to the storage volumes. All input/output commands for the storage volumes are handled by the volume controller, which also provides a cache memory to speed up portions of the data handling. Power for the overall storage system is provided by a mains electricity supply, with a back-up power supply in the form of a so-called UPS (uninterruptible power supply).

UPS devices effectively function as a battery maintaining a certain amount of charge that will be used when the mains power is cut for any reason. The UPS provides enough power for the storage controller to shut down the system in an orderly manner without any data being lost. The main requirement for the power is the controller's cache, which requires power to maintain the data it stores, and must have its data hardened to some form of permanent storage device, such as the controller's hard disk.

SUMMARY OF THE INVENTION

Problems may arise in computer storage systems where an emergency power off (EPO) has occurred, and for some reason the system controller mechanism that shuts the system down and turns off the UPS has not worked properly. For example, the storage volume controller may operate until the UPS supply (which functions as a large rechargeable battery) is drained and then is forced off due to lack of power. When the storage system has the power restored, the storage volume controller may not operate until the UPS has recharged its emergency supply so that the system can run safely. As the UPS has to fully recharge, this may take some time before the storage volume controller is available for work, causing an unnecessarily long outage. The consequence of the power cut is that when a system comes to restore power and start the storage volume controller, the system has to wait for perhaps two hours before the storage volume controller starts while the UPS charges. The aforementioned example demonstrates a situation where the performance of the storage volume controller (and indeed many UPS powered devices) is not optimum and which can be improved.

In view of the foregoing, various embodiments for executing emergency power off/on cycles and resuming normal work in storage systems via a three-stage power up mechanism are provided. In one embodiment, by way of example only, a method of operating a storage system is provided. The method includes the steps of detecting a cut in an external power supply, switching to a local power supply, preventing receipt of input/output commands, copying the content of cache memory to a local storage device, detecting resumption of the external power supply, charging the local power supply, copying the content of the local storage device to the cache memory, processing the content of the cache memory with respect to the or each storage volume, detecting that the charge stored on the local power supply exceeds the charge required to copy the content of the cache memory to the local storage device by a predetermined amount, allowing receipt of input/output commands using a reduced portion of the cache memory, detecting that the charge stored on the local power supply has reached a predetermined level, and allowing receipt of input/output commands using all cache memory.

Additional system and computer program product embodiments are disclosed and provide related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION OF THE DRAWINGS

Owing to the mechanisms of the illustrated embodiments, it is possible to provide an improvement in storage systems which will shorten the down time for customers in the case above where there is a loss of power and the local power supply (the UPS) continues to supply power in place of the mains for as long as it can but also in the many cases where the UPS is partially drained during an emergency power off.

A shutdown is usually not instantaneous, and may take longer than envisaged, for example due to a large workload taking more time to be destaged from in-memory cache or communications failures causing time-outs or other reasons such as unusually large amounts of I/O traffic (perhaps triggered by the power-off event or system failover) causing the shutdown to drain a good proportion of the UPS stored charge. Usually, as of today, when power is restored the first thing that is achieved is the re-establishment of the UPS safety net by recharging the UPS to its normal operating level of charge.

One aspect of the illustrated embodiments is that the UPS does not need to be fully charged (or indeed charged to a set, fixed level) to allow safe commencing of work but it only needs to contain the sum of: A) enough power to perform a safe shutdown of the underlying empty system plus B) the variable length of time an emergency shutdown takes that correlates with the workload that is done during that operation. The system reduces the requirement due to B) above, which shortens the dead time that the system is down. On start-up, after a shutdown, the workload can be made/choked to perform a ramping up process. This then provides an opportunity for the shutdown recovery time to be shortened, which is very valuable as it represents less down time of the storage system.

In one embodiment, the UPS and the system it supports can communicate about how much charge is found in the UPS, and the storage volume controller can reason about the amount of workload currently in the cache memory that would need to be destaged on shutdown, relative to how much charge is in the battery. These aspects may be then coupled with the ability to choke the variable portion of the EPO work (for example, in the storage volume controller case by limiting the amount of cache used), allowing the system to more quickly recover after a charge-draining shutdown.

The principles of the invention can be applied to other UPS protected devices or devices with an internal battery which is relied upon to perform an emergency shutdown in the event of a primary power failure.

In one embodiment, the mechanisms of the present invention allowing receipt of input/output commands, using only a reduced cache memory, comprises locking a portion of the cache memory from use. In an additional embodiment these mechanisms further comprise reducing the size of the locked portion of the cache memory in proportion to the increased charge on the local power supply. By locking a portion of the cache, the storage volume controller ensures that the new I/O material is never able to push the system to a point where there is insufficient charge in the local power supply to successfully deal with a new power cut in the mains power supply.

Advantageously, the mechanisms of the present invention providing for detecting that the charge stored on the local power supply has reached a predetermined level comprises detecting that the charge stored on the local power supply has reached the level required to copy the entirety of the cache memory to the local storage device. The point at which it becomes safe to allow all new I/O material may be defined as the point where the local power supply is now fully charged, but the system can be configured to allow all new material at an early point (i.e., where there is sufficient charge in the local power supply to copy of the entirety of the cache). As a result, the system may start taking new work earlier than would otherwise be the case if the system waited until the local power supply was fully charged.

Figure 1:
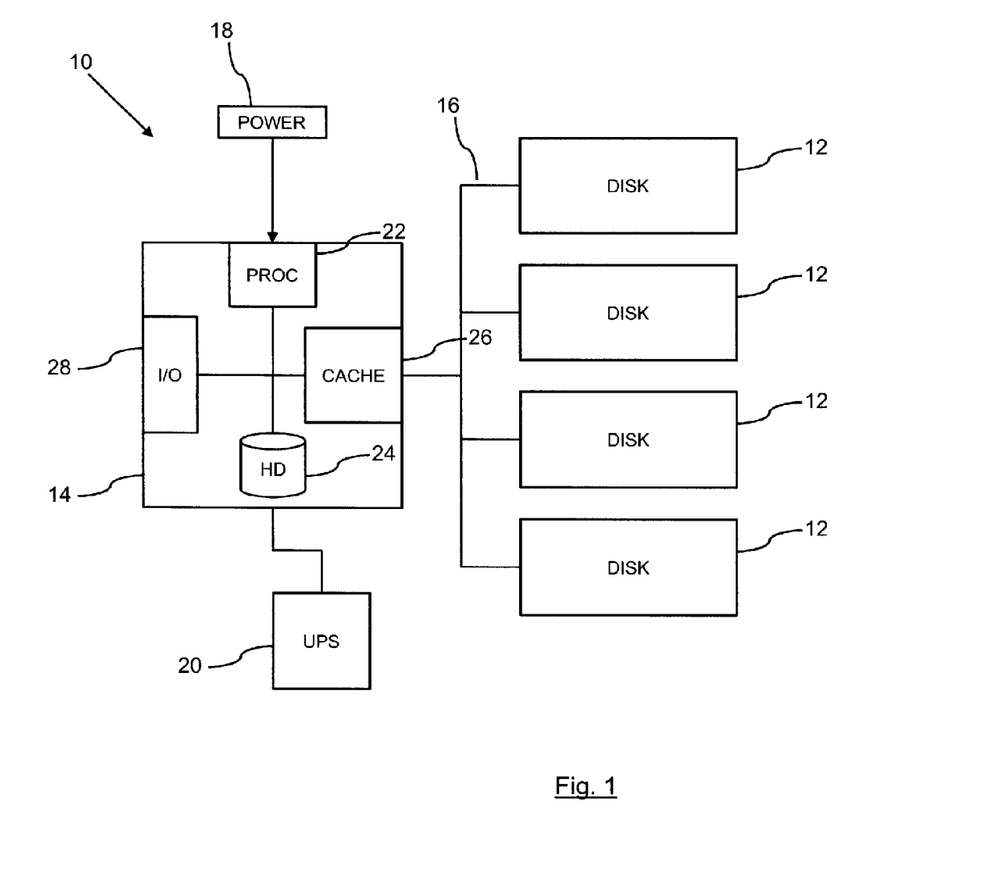
FIG. 1 is a schematic diagram of an exemplary storage system.

FIG. 1 illustrates an exemplary storage system 10. The storage system 10 comprises a number of storage volumes (here labeled as "disks") 12 which are connected to a storage volume controller 14. The storage volume controller 14 has a connection 16 to each storage volume 12, which, in one embodiment, is a fibre channel cable. The storage volume controller 14 manages the access to the storage volumes 12. All read and write requests made to the storage volumes are made through the storage volume controller 14. To an external computer connecting to the storage volume controller 14, the various disks 12 appear as a single memory storage function, regardless of the actual number of volumes 12 present.

The system 10 also includes an external power supply 18 and a local power supply 20. The external power supply 18 in the normal operation of the system powers the storage volume controller 14 and the storage volumes 12. The external power supply 18 is the standard electrical mains supply. The local power supply 20 is a battery that maintains an amount of charge for use when the external power supply 18 is cut off. The local power supply 20 is re-chargeable, and is charged by the mains supply 18. The local power supply 20 is a UPS (uninterruptible power supply) and provides the necessary backup to avoid data loss if there is a mains power cut.

The storage volume controller 14 comprises a processor 22, a local storage device 24, a cache memory 26 and an interface 28 for receiving input/output commands from external computers with respect to the storage volumes 12. The cache memory 28, which could be of the order of several 100 GBs in size, is used in the processing of all input/output commands and will maintain a certain amount of the storage data. Since the cache memory 28 is much faster than the memory provided by the disks 12, repeated I/O commands to the same memory area will be handled by the cache 26 and only periodically will data be hardened to the volumes 12.

When a power failure occurs, the storage volume controller 14 uses the charge on the UPS 20 to power the system 10 while the storage volume controller 14 does a safe shut down. The main activity of this shutdown is to dump the internal memory cache 26 to a non-volatile storage, which is the local hard disk drive 24. The time this takes is directly related to the size of the cache 26 used and the speed of the local disk 24, with larger caches taking longer to save to disk in an emergency power off.

Currently, when power is restored the storage volume controller 14 waits until the UPS 20 reports a level of charge that is enough for normal system operation before the storage volume controller 14 starts accepting new work in a completely normal manner (i.e. fully cached). However, pursuant to the illustrated embodiments of the present invention, the storage volume controller 14 is configured to restart operation earlier, as described in detail below. The storage volume controller 14 also has features to limit the amount of cache 26 used by a particular storage volume 12 to prevent a slow disk 12 using all of the cache 26. This can be used to choke down the amount of cache 26 used initially after an emergency shutdown.

Figure 2A:
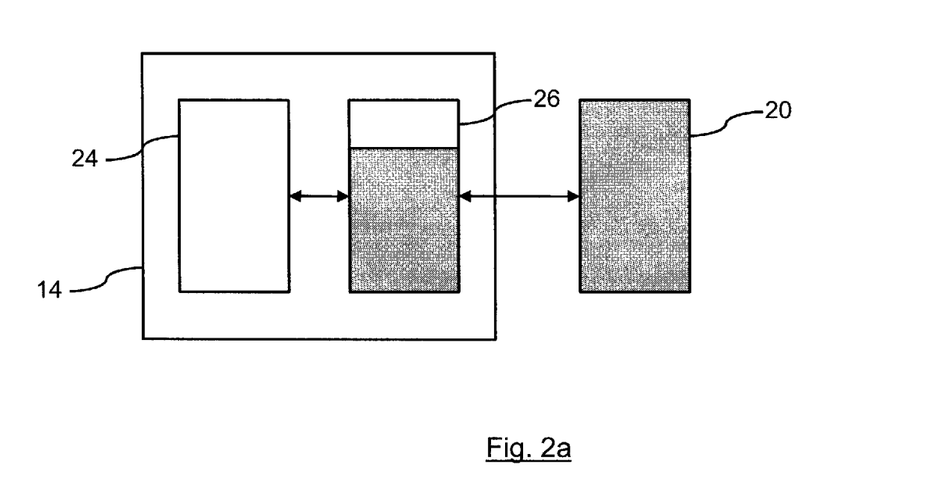
FIGS. 2a and 2b are schematic diagrams of a part of the storage system acting in an exemplary response to a power cut.
Figure 2B:
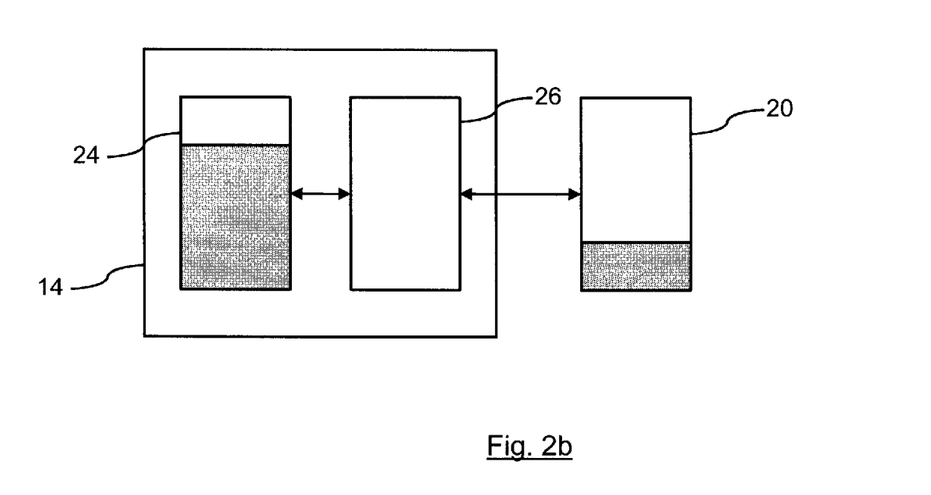

FIG. 2 illustrates schematically the operation of the system 10 when an emergency power off occurs as a result of the mains supply 18 being cut off. This Figure shows the storage volume controller 14 with the cache 26 and the local storage device (hard disk) 24. The UPS 20 is also shown. At this point in the working operation of the system 10, as shown in FIG. 2a, the cache 26 is 75% full of data, as indicated by the shaded bar and the UPS 20 is 100% full of charge, again as indicated by the shaded bar. After the power cut, then the storage volume controller 14 must copy the data in the cache 26 to the hard disk 24, as shown, after completion, in FIG. 2b. The data in the cache 26 has been copied to the storage device 24, and the UPS 20 now only has 25% charge after using its charge to power the copy operation.

Figure 3A:
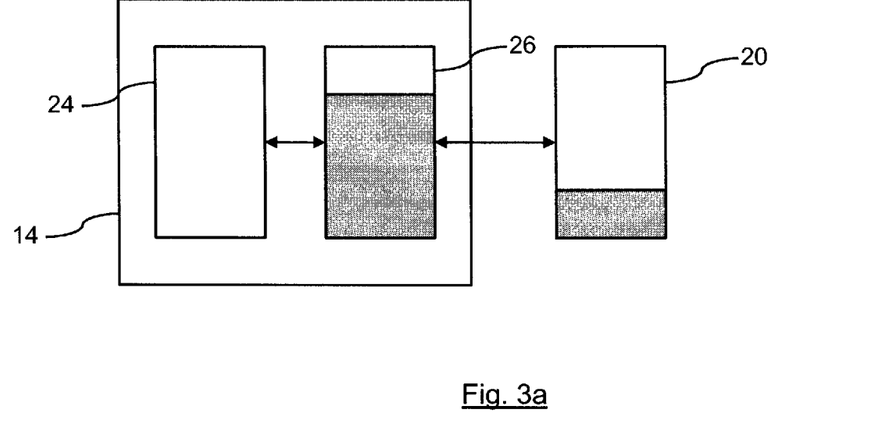
FIGS. 3a and 3b are schematic diagrams of a part of the storage system acting in an exemplary first stage response to restoration of power according to aspects of the present invention.
Figure 3B:
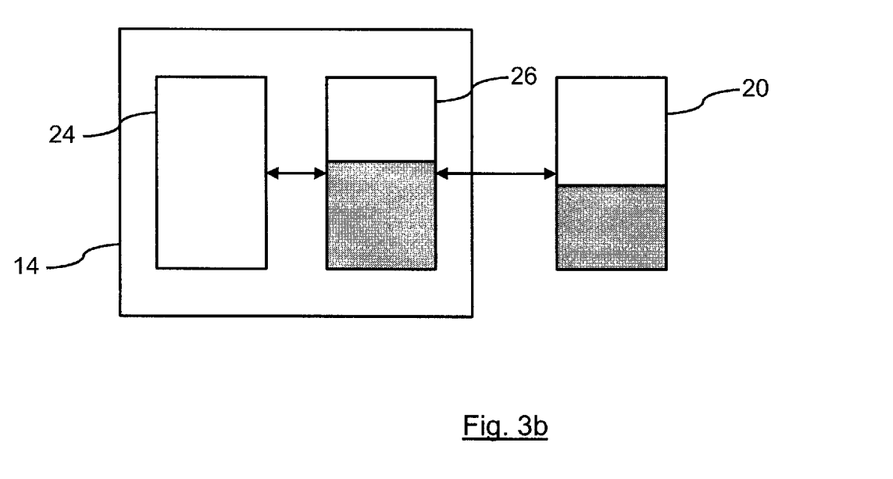

The storage volume controller 14 operates after an emergency shutdown, once power has been restored, to power up in three stages. An exemplary process of powering up over three stages is shown in FIG. 3a-FIG. 5, following. Turning first to FIGS. 3a and 3b, stage 1 is illustrated. On power up after an emergency power off that used up a proportion of the UPS charge, the first action that is taken is that the content of the disk 24 is copied back to the cache 26, and at the same time, the UPS 20 charges its battery as fast as possible. During this stage, no new write workload is accepted as it is not yet safe to do I/O in case of a second power cut before there is enough charge in the UPS 20 to protect against a second power failure. This is illustrated in FIG. 3a.

During this stage, the storage volume controller 14 does complete work that is represented in the cache 26, destaging writes that are in its hardened cache data (that it restored from the cache dump on the local hard disk during its start up) to storage as fast as possible. As the storage volume controller's cache 26 is destaged to the external disks 12, the storage volume controller 14 will effectively shrink the active cache size in use, as the storage volume controller 14 is currently not accepting any new work so there is no creation of new dirty data in the cache 26. Over time, the full size of the cache 26 in use is reduced downwards as the dirty data in the cache 26 is de-staged to disk 12. So, during this stage, the charge in the UPS 20 is increasing and the amount of the cache 26 with dirty data is reducing as the storage volume controller 14 is not accepting new work, as shown in FIG. 3b.

Eventually a point will be crossed where the UPS 20 has enough charge to cope with the runtime required to do a minimum clean shutdown of the hardware and operating system, but not enough charge to use for keeping the system active while it saves all the cache memory to local disk. However, the amount of charge in the UPS 20 is still increasing and the size of the dirty cache 26 is decreasing, due to the destaging process described above. In terms of the improved system 10, the increasing charge and decreasing size of the cache are converging and at a certain point in time, a tipping point will be crossed. From this point on, there exists a window of time during which the UPS 20 will have more than the required amount of charge to cope with a shutdown of the storage volume controller 14, but with the reduced amount of cache 26, and at this point the storage volume controller 14 will enter stage 2.

Figure 4A:
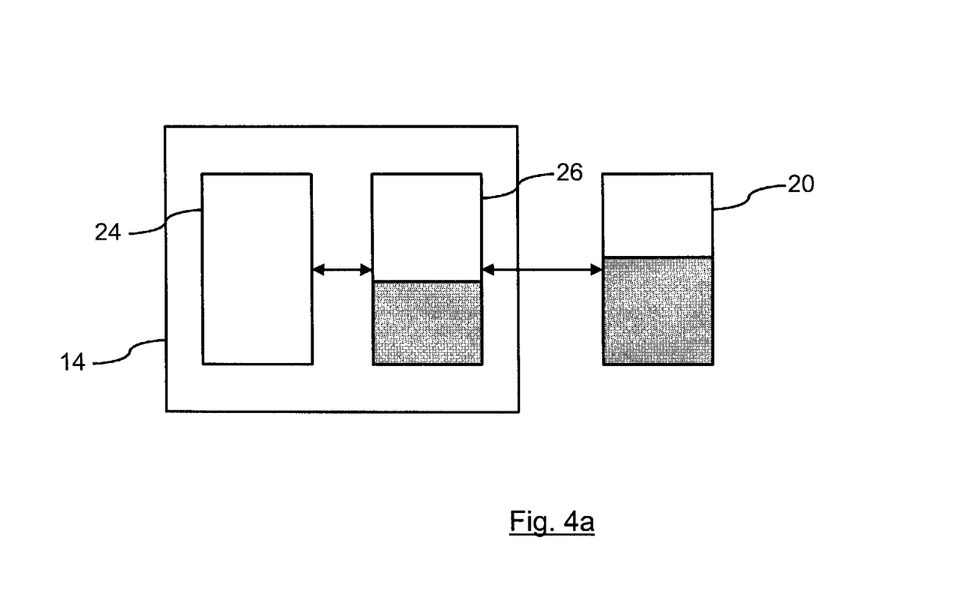
FIGS. 4a and 4b are schematic diagrams of a part of the storage system acting in an exemplary second stage response to restoration of power according to aspects of the present invention.

FIG. 4a shows the occurrence of this point where the charge on the UPS 20 sufficiently exceeds the amount of data stored by the cache 26 for it to be safely assumed that the UPS 20 carries sufficient charge to be able to copy the contents of the cache memory 26 to the local disk drive 24, if another unscheduled power outage was to occur. The exact definition of the tipping point will depend upon the margin of error that is included within the calculation of the ratio between the data stored on the cache 26 and the charge stored by the battery 20. In general, in a practical implementation of the system 10, this margin of error can be set by an administrator.

Once the point shown in FIG. 4a has been reached, then the storage volume controller 14 can now begin to do application work again, but with a reduced sized cache represented by the currently dirty pages/cache-lines plus 1 page/line. As there will only be a very small amount of extra power available for the time the system will take to destage the active cache to disk, of course multiplied by a safety ratio plus margin. Normal cache paging operations can be used just that there is a fixed set of cache pages that are locked and not used by the storage volume controller 14. Effectively the storage volume controller 14 can take on new work as long as it does not push up the amount of data stored by the cache 26 above the level that can be copied to the disk 24 by the charge stored by the UPS 20.

Figure 4B:
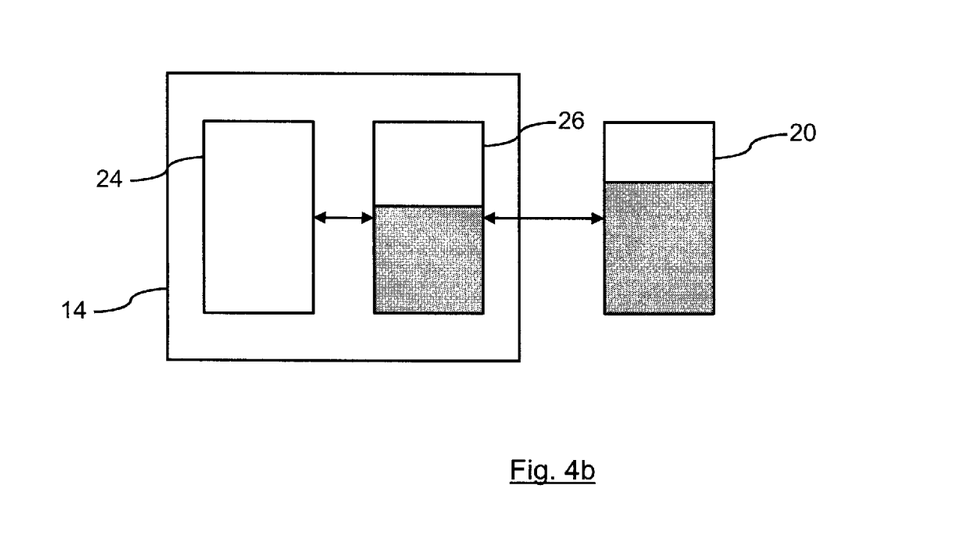

As the UPS 20 takes on more charge, this is monitored by the storage volume controller 14 and the cache size is allowed to grow in line with the increased charge in the UPS 20, but never larger than what can be dumped within the actual UPS runtime available at any point. FIG. 4b illustrates this situation, where the UPS 20 is continuing to be charged upwards and at the same time the available memory space within the cache 26 is also increasing, but always lagging behind the power on the UPS 20 by the defined margin of error. I/O commands received by the storage volume controller 14 are processed using the reduced cache 26.

Figure 5:
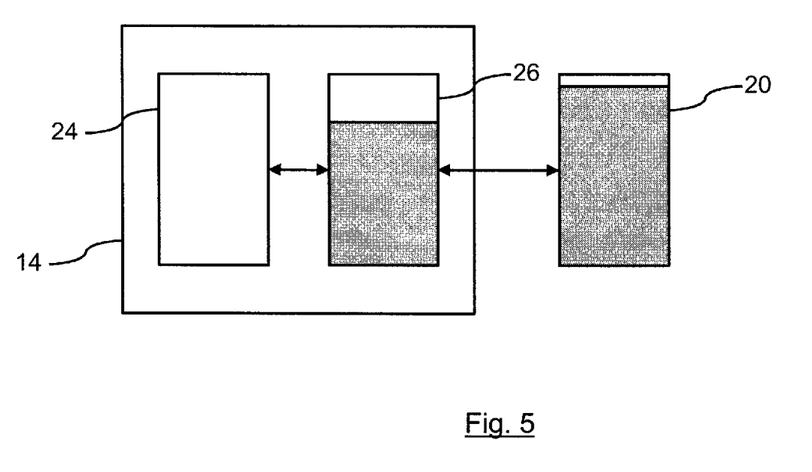
FIG. 5 is a schematic diagram of a part of the storage system acting in an exemplary third stage response to restoration of power according to aspects of the present invention.

Once the UPS 20 is fully charged, or more precisely, once the storage volume controller 14 decides that the UPS 20 is carrying enough charge to dump the whole cache 26, (multiplied by a safety ratio plus margin etc.) the storage volume controller 14 can allow its cache 26 to be fully utilized and can stop actively monitoring the UPS charge level versus cache size. This is the final stage 3 in the three-stage power up process. The process is finished and normal operation is resumed. This is shown in FIG. 5.

The system can be seen to apply to any battery backed EPO system where the activity occurring during EPO can be reduced in size and the system can run in a limited way with a subset of the assets that are dumped during EPO. When the cost of an EPO has some element of variable cost and the system has some utility when running with this cost reduced.

A pseudo code for the process is described below. For a system that, for example, wishes to allow for two consecutive power failures by having enough UPS charge for two shutdowns one would simply multiply the factor for the cache size above by a factor of two and so on (+2*the fixed amount for processing operating system and hardware shutdown etc). Note that a term such as "enough charge to safely shutdown the system" is to be assumed to include the desired margin of error and any multiples chosen to cope with multiple power failures.

The level of charge in the UPS is expressed as a runtime (in seconds). UPSs commonly make this figure available to the using system based on the present power consumption and assume that the power consumption remains constant. During the emergency power off, the storage volume controller 14 will record on the local hard disk 26 (a) the start time of the total EPO, (b) the start time of the cache dump to local disk 26, (c) the end time of the cache dump to disk 26, (d) the size of the cache dumped to disk 26 and (e) the time the total EPO is finishing.

---

Stage 1

Restore local cache from the dumped copy in local disk (as today)
Calculate:
1. how expensive the whole EPO was in terms of runtime (e–a) above
2. how expensive the cache dump to local disk was in terms of runtime (c–b)
3. subtract 2. from 1. to get the 'fixed' cost of the EPO in terms of runtime
4. the_cache_amount_dumped_per_unit_charge (for example, Megabytes per Second) of
the cache dumping process. (d/(c–b) in the list above)
Loop 1 while (UPS does not have enough charge to safely shutdown the hardware and operating system (not including cache dumping) ) {
    do not accept new work
    for (each dirty (written to) cache line (advantageously for the fastest storage controllers)) do -continued Stage 1

```
        de-stage the cache line to external disk and mark the cache line as
        'clean'
        recalculate the size of the remaining dirty cache
        get current charge level (predicted runtime) from the UPS
        spare_charge = (current UPS charge) − ( 3. i.e fixed cost of EPO in
        terms of charge)
        if( spare_charge < 0 ){
            loop around again to Loop 1
    }
    if ( sizeof ( dirty cache ) < ( cache_amount_dumped_per_unit_charge *
    spare_charge ) {
            lock cache at the total size of the current dirty cache lines (mark
            clean lines as unusable)
            record UPS charge level to UPS_charge_high_water_mark ("UP-
            S_hwm")
                    exit Loop 1
        }else{
            loop round to Loop 1 again.
        }
    }
Stage 2 (Note: the term "active cache" denotes the amount of memory
that may be saved at EPO. It includes the "dirty cache" and memory
available for new I/O commands which will become 'dirty' as new I/O
is processed.)
while( active cache < full cache size ) {
        allow an amount of IO or an amount of time to pass on the reduced
        size of cache
        get current charge from the UPS
        if( current UPS charge > UPS_hwm ) {
            spare_charge = (current UPS charge) − ( 3. i.e fixed cost of
            EPO in terms of charge)
            active cache = spare_charge *
            cache_amount_dumped_per_unit_charge UPS_hwm =
            current UPS charge
        }
    }
Stage 3
        run as normal (The UPS has enough charge to dump the full
        cache)
```

Figure 6A:
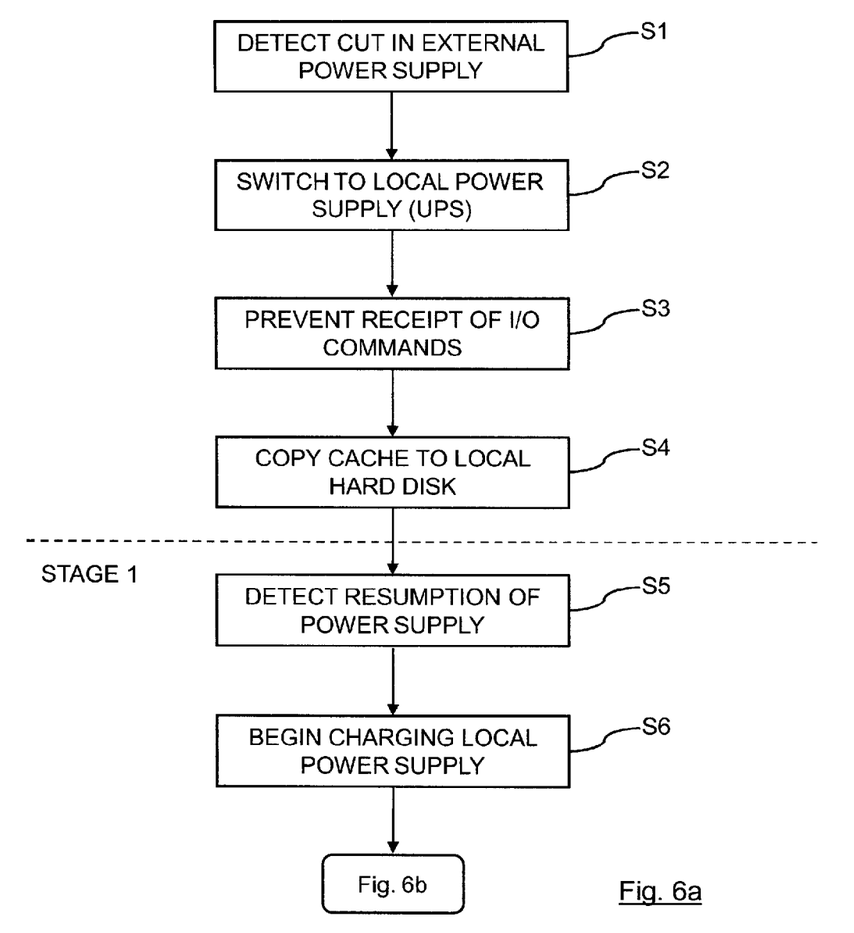
FIGS. 6a and 6b are flowcharts of a method of operating the storage system in which aspects of the present invention and claimed subject matter may be implemented.
Figure 6B:
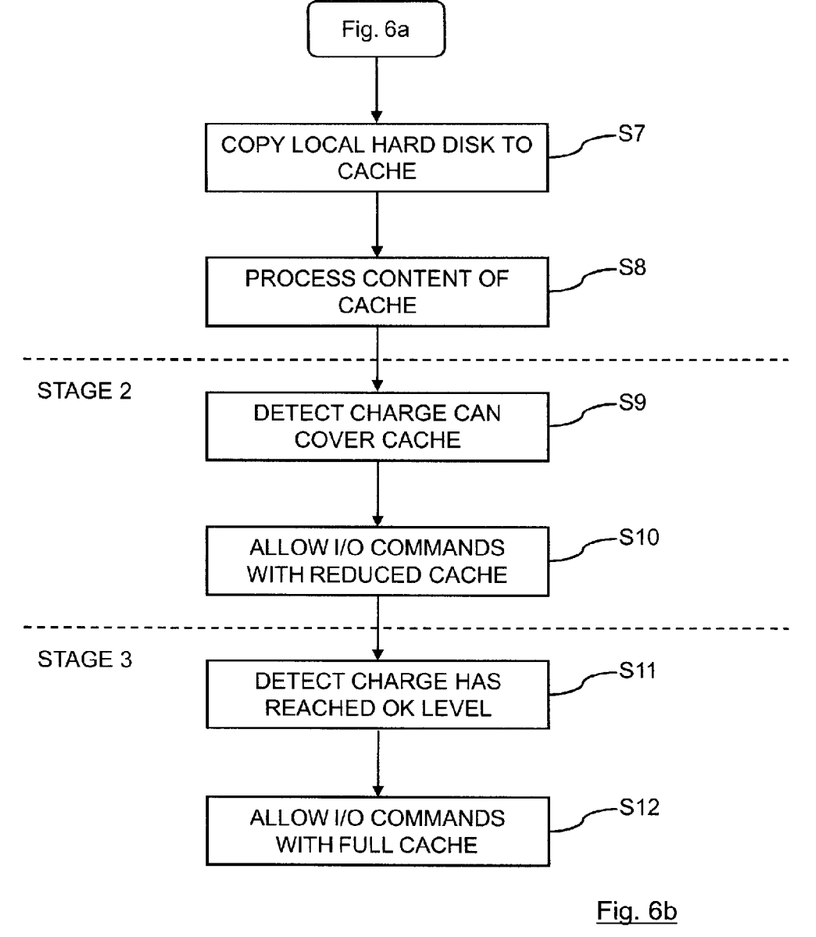

FIGS. 6a and 6b, following, illustrate an exemplary method of operating the storage system according to one embodiment of the present invention. The processor 22 controls the operation of the storage volume controller 14, using either dedicated hardware routines or software from a computer program product on a computer readable medium. Turning first to FIG. 6a, step S1 is the step of detecting a cut in the external power supply 18, which is followed by step S2 of switching to the local power supply 20. After this is step S3 of preventing receipt of input/output commands and step S4 copying the content of the cache memory 26 to the local storage device 24. These four steps represent the action taken by the storage volume controller 14 in response to the EPO.

The three-stage power up begins in the next step, step S5, which comprises detecting the resumption of the external power supply 18. Stage 1 continues with the step S6 of charging the local power supply 20, and following in FIG. 6b with the step S7 of copying the content of the local storage device 24 to the cache memory 26, and finally the step S8 of processing the content of the cache memory 26 with respect to each storage volume 12. During this stage S8, the data stored in the cache 26, such as writes for different storage volumes, are carried out, to reduce the amount of data stored by the cache 26. Stage 1 continues until the tipping point is reached.

Stage 2 starts with step S9, when it is detected that the charge stored on the local power supply 20 exceeds the charge required to copy the content of the cache memory 26 to the local storage device 24 by a predetermined amount (the margin of error). The storage volume controller 14 then changes its policy to allow the receipt of input/output commands (step S10), though using only a reduced cache memory 26. The I/O will always be accepted but normal cache paging algorithms will apply to the reduced size of cache memory 26. None of the cache 26 that is locked and empty will be used but a page from the reduced size of cache memory 26 will be "swapped out" or "paged" to a disk 12 using a cache paging algorithm. The controller 14 constrains the size of the used cache memory 26 to a (growing) limit and pages normally within the cache 26.

The final stage 3 is entered when the step S11 of detecting that the charge stored on the local power supply 20 has reached a predetermined level, step S11 and the process is completed by step S12 of thereby allowing receipt of input/output commands using the full cache memory 26.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of operating a storage system following a power loss, comprising:
    detecting a loss of power from a primary power supply;
    preventing receipt of input/output commands at a cache memory in response to detecting the loss of power;
    copying contents in the cache memory to a non-volatile memory in response to detecting the loss of power;
    detecting resumption of the primary power supply;
    charging a secondary power supply utilizing the primary power supply;
    copying contents of the non-volatile memory back to the cache memory in response to detecting the resumption of the primary power supply;
    transmitting the contents of the cache memory to at least one storage volume while continuing prevention of receipt of input/output commands at the cache memory;
    detecting that a charge stored on the secondary power supply exceeds a first threshold amount of charge required to copy the contents of the cache memory to the non-volatile memory by a predetermined amount;
    enabling receipt of the input/output commands at a reduced rate in response to detecting that the charge stored on the secondary power supply exceeds the first threshold amount of charge, wherein:
        enabling receipt of the input/output commands at the reduced rate comprises locking a portion of the cache memory from use,
        the reduced rate dependent upon the amount of charge stored on the secondary power supply, and
        the reduced rate decreases over time as the secondary power supply charges;
    detecting that the charge stored on the secondary power supply has reached a second threshold amount; and
    allowing receipt of the input/output commands at a full rate at the of the cache memory in response to detecting that the charge stored on the secondary power supply has reached the second threshold amount.

2. The method of claim 1, further including switching to the secondary power supply in response to detecting the loss of power.

3. The method of claim 1, further including reducing the size of the locked portion of the cache memory in proportion to an increased charge on the secondary power supply.

4. The method of claim 1, wherein the step of detecting that the charge stored on the secondary power supply has reached the first threshold amount comprises detecting that the charge stored on the secondary power supply has reached an amount required to copy the entirety of the cache memory to the non-volatile memory.

5. A method of operating a storage system following a power loss, comprising:
    detecting a loss of power from a primary power supply;
    using a rechargeable power supply to power the storage system in response to detecting the loss of power;
    detecting resumption of the primary power supply;
    copying contents in a non-volatile memory to a cache memory in response to detecting the resumption of the primary power supply;
    transmitting the contents of the cache memory to at least one storage volume while preventing of receipt of input/output commands at the cache memory;
    detecting that a charge stored on the rechargeable power supply exceeds a first threshold amount of charge required to copy contents of the cache memory to the non-volatile memory;
    enabling receipt of input/output commands at the cache memory at a reduced rate in response to detecting that the charge stored on the rechargeable power supply exceeds the first threshold amount of charge, wherein:
        enabling receipt of the input/output commands at the reduced rate comprises locking a portion of the cache memory from use,
        the reduced rate is dependent upon the amount of charge stored on the rechargeable power supply, and
        the rate increases over time as the rechargeable power supply charges;

detecting that the charge stored on the rechargeable power supply has reached a second threshold amount; and allowing receipt of the input/output commands at the of the cache memory at a maximum rate in response to detecting that the charge stored on the rechargeable power supply has reached the second threshold amount.

6. The method of claim 5, further comprising ceasing to use the rechargeable power supply in response to detecting the resumption of the primary power supply.

7. The method of claim 6, further comprising utilizing the primary power supply to charge the rechargeable power supply upon resumption of the primary power supply.

8. The method of claim 5, further including switching to the rechargeable power supply in response to detecting the loss of power.

9. The method of claim 5, further including reducing the size of the locked portion of the cache memory in proportion to an increased charge on the rechargeable power supply.

10. The method of claim 5, wherein detecting that the charge stored on the rechargeable power supply has reached the first threshold amount comprises detecting that the charge stored on the rechargeable power supply has reached an amount required to copy the entirety of the cache memory to the non-volatile memory.

\* \* \* \* \*